(12) United States Patent
Kutscher et al.

(10) Patent No.: US 10,291,552 B2
(45) Date of Patent: *May 14, 2019

(54) METHOD FOR PROVIDING AN INFORMATION CENTRIC NETWORK WITH A SOFTWARE DEFINED NETWORK AND CONTROLLER OF THE SOFTWARE DEFINED NETWORK

(71) Applicant: NEC CORPORATION, Tokyo (JP)

(72) Inventors: Dirk Kutscher, Heidelberg (DE); Fabian Schneider, Heidelberg-Bahnstadt (DE)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,202

(22) Filed: Aug. 25, 2017

(65) Prior Publication Data

US 2018/0006968 A1    Jan. 4, 2018

Related U.S. Application Data

(63) Continuation of application No. 14/783,084, filed as application No. PCT/EP2013/057719 on Apr. 12, 2013, now Pat. No. 9,781,061.

(51) Int. Cl.
*H04L 12/28*     (2006.01)
*H04L 12/935*    (2013.01)
(Continued)

(52) U.S. Cl.
CPC .......... *H04L 49/3009* (2013.01); *H04L 45/38* (2013.01); *H04L 45/566* (2013.01); *H04L 45/64* (2013.01)

(58) Field of Classification Search
CPC ... H04L 49/3009; H04L 45/38; H04L 45/566; H04L 45/64
See application file for complete search history.

(56) References Cited

U.S. PATENT DOCUMENTS

2012/0204224 A1    8/2012  Wang et al.
2013/0039249 A1*   2/2013  Ravindran .......... H04W 76/002
                                              370/312

(Continued)

OTHER PUBLICATIONS

Blefari Melazzi N et al: "An OpenFlow-based testbed for information centric networking", Future Network&Mobile Summit (FUTURENETW), 2012, IEEE, Jul. 4, 2012 (Jul. 4, 2012), pp. 1-9, XP032231964.

(Continued)

*Primary Examiner* — Abdelnabi O Musa
(74) *Attorney, Agent, or Firm* — Leydig, Voit & Mayer, Ltd.

(57) ABSTRACT

A method provides an information centric network with a software defined network based on an information centric networking protocol on top of a physical network based on an internet protocol. A controller in the software defined network receives a first packet of an object request in the information centric network. The controller encodes a message ID indicating an object source of the object request into a header of the first packet. The controller installs forwarding rules on forwarding elements in the physical network such that further packets of the object request are forwarded according to the installed forwarding rules by the forwarding elements rewriting headers of the further packets.

17 Claims, 5 Drawing Sheets

(51) Int. Cl.
    *H04L 12/721*     (2013.01)
    *H04L 12/715*     (2013.01)

(56) References Cited

U.S. PATENT DOCUMENTS

| | | | | |
|---|---|---|---|---|
| 2013/0060962 A1* | 3/2013 | Wang | ................... | H04L 67/327 |
| | | | | 709/238 |
| 2013/0332619 A1* | 12/2013 | Xie | .................... | H04L 67/2823 |
| | | | | 709/230 |
| 2014/0189060 A1* | 7/2014 | Westphal | .......... | H04W 36/0016 |
| | | | | 709/217 |
| 2016/0226782 A1* | 8/2016 | Schneider | ........... | H04L 67/2833 |

OTHER PUBLICATIONS

Blefari Melazzi N et al: "Route discovery and caching: A way to improve the scalability f Information-Centric Networking", Global Commnications Conference (GLOBECOM), 2012 IEEE, IEEE, Dec. 3, 2012 (Dec. 3, 2012), pp. 2701-2707, XP032375082.

Luca Veltri et al: "Supporting information-centric functionality in software defined networks", Communications (ICC), 2012 IEEE International Conference on, IEEE, Jun. 10, 2012 (Jun. 10, 2012), pp. 6645-6650, XP032274736.

Dimitris Srivelis et al: "pursuing a Software Defined Information-centric Network", Software Defined Networking (EWSDN), 2012 European Workshop on; IEEE; Oct. 25, 2012 (Oct. 25, 2012), pp. 103-108, XP032283478.

\* cited by examiner

METHOD FOR PROVIDING AN INFORMATION CENTRIC NETWORK WITH A SOFTWARE DEFINED NETWORK AND CONTROLLER OF THE SOFTWARE DEFINED NETWORK

CROSS-REFERENCE TO RELATED APPLICATIONS

This application is a continuation of U.S. application Ser. No. 14/783,084 filed on Oct. 8, 2015, which is a U.S. National Phase application under 35 U.S.C. § 371 of International Patent Application No. PCT/EP2013/057719, filed on Apr. 12, 2013, the entire contents of which is incorporated by reference herein. The international application was published in English on Oct. 16, 2014, as WO 2014/166551 A1 under PCT Article 21(2).

FIELD

The present invention relates to a method for providing an information centric network with a software defined network based on an information centric networking protocol on top of a physical network based on the Internet Protocol.

BACKGROUND

Software defined networks are based on providing an application programmable interface for forwarding devices, for example switches or routers enabling programmability of these forwarding devices and therefore the entire network. Recently information centric networking was introduced, wherein communication within information centric networks is based on requests and responses: Requestors send requests to the information centric network, asking for named data objects that have been published before and that are available in one or many copies in the information centric network. Networking elements, for example forwarding elements receiving a request decide where to forward the requests to, for example which interface to use for forwarding the request. Once a request has been forwarded and reached the object source, for example a named data object copy in a cache, a corresponding response message is relayed back to the requestor.

Conventional methods for providing an information centric network use internet based protocols for the physical network tailored to support host to host communication using IP and TCP/UDP with additional mechanisms. For example an overlay network is created on top of the existing physical network and additional routing and forwarding mechanisms are implemented in the overlay network by certain applications. However, one of the disadvantages of these conventional methods is, that both hosts need to have special support for these mechanisms causing overhead for the overlay management and encapsulation inside the internet protocol.

Another conventional method for providing an information centric network, for example is described in N. Blefari-Melazzi, A. Detti, G. Mazza, G. Morabito, S. Salsano, L. Veltri, An OpenFlow-based Testbed for Information Centric Networking, Future Network & Mobile Summit 2012, with border nodes performing name-to-location mapping with help by an external means of location lookup for requested named data objects. An IP option is defined to include the name of the requested named data object and an information centric network specific transport protocol is used. The border nodes encapsulate the original request in a new packet of the information centric network specific transport protocol. A flow identifier representing the object's name with a one-to-one mapping will be embedded in the transport protocol port numbers. The software defined network in form of an open flow control network then uses these port numbers to forward the packet to the appropriate location or locations. The border node keeps a pending interest table enabling reversing the encapsulation and sending the response to the original requestor.

SUMMARY

In an embodiment, the present invention provides a method for providing an information centric network with a software defined network based on an information centric networking protocol on top of a physical network based on an internet protocol. A controller in the software defined network receives a first packet of an object request in the information centric network. The controller encodes a message ID indicating an object source of the object request into a header of the first packet. The controller installs forwarding rules on forwarding elements in the physical network such that further packets of the object request are forwarded according to the installed forwarding rules by the forwarding elements rewriting headers of the further packets.

BRIEF DESCRIPTION OF DRAWINGS

There are several ways how to design and further develop the teaching of the present invention in an advantageous way. To this end it is to be referred to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawings

DETAILED DESCRIPTION

Figure 1:
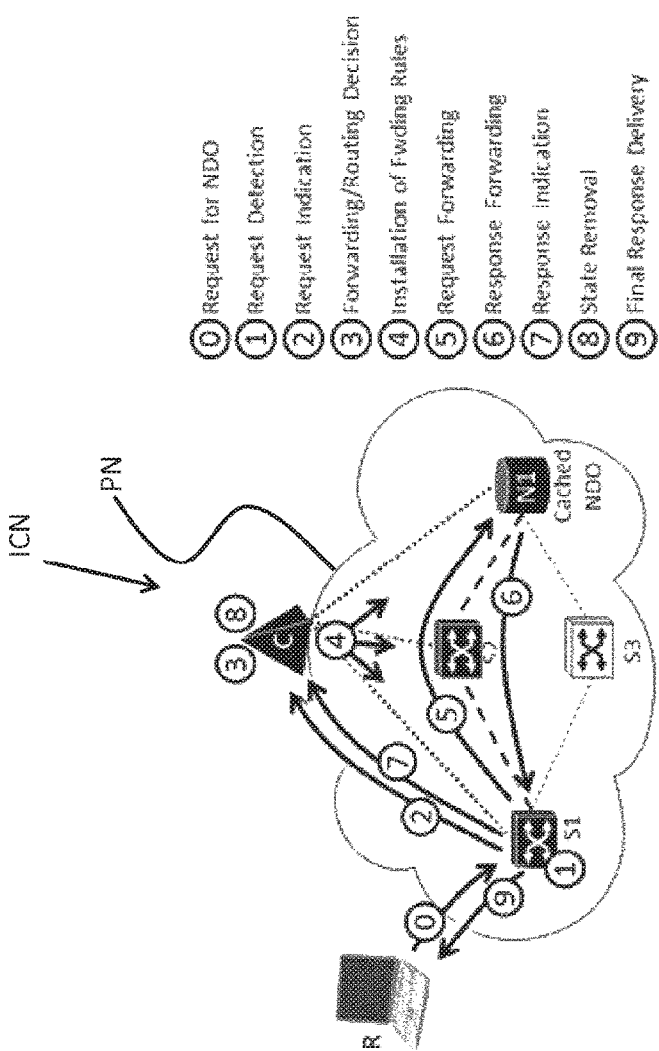
FIG. 1 shows a method and a system according to a first embodiment of the present invention.

The present invention relates to a method for providing an information centric network with a software defined network based on an information centric networking protocol on top of a physical network based on the Internet Protocol, comprising forwarding elements, preferably routers and/or switches, in the physical network and a controller in the software defined network for controlling the forwarding elements.

The present invention relates also to a system for providing an information centric network with a software defined network based on an information centric networking protocol on top of physical network based on the Internet Protocol, preferably for performing with a method according to one of the claims, comprising forwarding elements, preferably routers and/or switches, in the physical network and a controller in the software defined network for controlling the forwarding elements.

The above described conventional methods have certain disadvantages: One of the disadvantages is that an outside requestor, i.e. a requestor outside the information centric network, but connected to it, does not know where to send requests initially and how to reach a border node of the information centric network from outside. A further disadvantage is that a border node has to perform packet encapsulation respectively packet decapsulation leading to an increased load on the border node. Another disadvantage is, that by using IP option packets are typically routed on a "slow" path in the forwarding elements, in particular they will be processed by the forwarding element's GPU. An even further disadvantage is, that a new transport protocol is required which might be blocked at various network elements, in particular those outside control of the information centric network. Even further information centric network nodes, preferably caches or servers, and an outside requestor are not able to operate on regular UDP or TCP sockets, thus requiring changes to the underlying Operating System. Furthermore, the nodes and the requestor have to be provided with the information how to communicate with a name resolution service.

In an embodiment, the present invention provides a method and a system for providing an information centric network which enable information centric network communication over existing IP networks.

In an embodiment, the present invention provides a method and a system enabling an easy mechanism to determine a target address from outside the information centric network.

In an embodiment, the present invention provides a method and a system which is easy to implement and in particular avoiding or at least reducing the probability of blocking of information centric network protocol packets at network elements.

In an embodiment, the present invention provides a method and a system which do not require changes to underlying Operating Systems and their networking stacks in information centric network nodes like, requestors, object sources, caches, etc.

In an embodiment, the present invention provides a method and a system which reduce load on the network elements, in particular the border node and/or data forwarding elements.

In an embodiment, the present invention provides a method and a system ensuring flexibility in particular in terms of aggregation of destinations, routes or forwarding rules.

In an embodiment, the present invention provides an alternative method and system for providing an information centric network.

In an embodiment, a method for providing an information centric network comprises a software defined network based on an information centric networking protocol on top of a physical network based on the internet protocol, comprising forwarding elements, preferably routers and/or switches, in the physical network and a controller in the software defined network for controlling the forwarding elements.

In an embodiment, the method is characterized in that a publicly routable network address per domain for outside data object requests of named data objects is announced via the information centric network or assisting name-lookup services (e.g., DNS), and when a first packet of an object request is received by an ingress element of the information centric network, the first packet is forwarded to the controller, wherein the controller determines an object source for the requested named data object, encodes a message id, preferably corresponding to the object source of the request and/or the requested named data object, into the packet, preferably into a header of the packet by IP-address- and port-rewriting, and that a forwarding path is established by the controller, preferably based on matching the message ID, to forward the packet and further packets to the determined object source.

In an embodiment, a system for providing an information centric network comprises a software defined network based on an information centric networking protocol on top of a physical network based on the internet protocol, comprising forwarding elements, preferably routers and/or switches, in the physical network and a controller in the software defined network for controlling the forwarding elements.

In an embodiment, the system is characterized by an information centric network domain name service operable to provide a publicly routable network address per domain for outside data object requests, by an ingress element of the information centric network operable to forward a first packet to the controller when a first packet of an object request is received by the ingress element, and by the controller being operable to determine an object source for the requested object, to encode a message id corresponding to the object source of the packet into the packet, preferably into a header of the packet by IP-address and/or port-rewriting, and to establish a forwarding path, preferably based on matching the message ID, to forward the packet and the further packets to the determined object source.

In an embodiment, it has first been recognized that a method and system are provided enabling a transfer of an information centric network request for named data objects and their corresponding responses over an IP network.

In an embodiment, it has further been recognized that routing and forwarding is separated by the software defined network, enabling low requirements in state maintenance and complexity on network or forwarding elements.

In an embodiment, it has further been recognized that no changes to Operating Systems on information centric network nodes are required enabling an easy implementation and migration path.

In an embodiment, it has further been recognized that the present invention enables information centric network requestors to send requests to an information centric network without any knowledge about cache location and/or addresses enhancing flexibility and reducing complexity for outside requestors.

In an embodiment, it has further been recognized that a tunable state management is enabled allowing to shift complexity from software defined network elements to the controller in a flexible way.

Further features, advantages and preferred embodiments are described in the following embodiments.

In an embodiment, forwarding rules are installed on the forwarding elements for forwarding further packets of the object request according to the determined object source wherein the forwarding elements then forward, preferably by rewriting headers of the further packets by one or more forwarding elements, the further packets of the object request according to the installed forwarding rules. Installing forwarding rules on the forwarding elements enables the forwarding elements to have to support only IP forwarding and do not need to have knowledge in the information centric networking protocol. Therefore the forwarding elements can be kept simple and the load on the forwarding elements is reduced.

In an embodiment, an information centric network prefix is announced by the SDN-controlled network. By announcing the information centric network prefix by the (physical) network controlled by the software defined network this ensures that for example IP routing delivers the first packet to the ingress element of the information centric network irrespectively of other nodes between the ingress element and the requestor.

In an embodiment, a default information centric network route is defined for sending incoming packets arriving at the ingress element matching no forwarding rule to the controller. This rule matches for example for a combination of destination IP and destination port and sends packets to the controller if they correspond to the information centric network prefix and have information centric network defined as destination port. This also includes a sending of a number of first bytes of a packet to the controller and installing of the whole packet in a local buffer. In such a case a configuration of the forwarding rule and the network element has to ensure that enough payload is transferred to the controller so that the complete requested object name is included for identifying the object request by the controller.

In an embodiment, origin information, preferably IP-address and port number, of the packet is stored before encoding the message ID. By storing origin information, i.e. the origin of the request, before encoding the message ID the origin information can then be used for determining a response route when the object source provides an object response back to the requestor of the object request.

In an embodiment, internal routing information of the information centric network is generated based on source information and origin information of the object request and response forwarding rules according to the internal routing information and/or according to the message ID are generated and installed on the forwarding elements. This enables an efficient routing for object responses. Further, internal routing information may be used for aggregating rules for response packets. By installing response forwarding rules according to this internal routing information, the object response may be delivered directly to the origin of the request, i.e. the requestor without having to route the object request indirectly via the controller to the requestor.

In an embodiment, the forwarding rules are installed only on the forwarding elements on the network path from the ingress element to the object source. This minimizes the traffic for controlling the information centric network since only those forwarding elements are provided with the corresponding forwarding rules which are on route from the object source to the requestor.

In an embodiment, the object source generates on receiving the object request a response comprising a plurality of response packets, wherein the first response packet is forwarded to the controller in case no response forwarding rules exist. This ensures that a correct response for the object request is transmitted to the requestor. The controller then may analyze the response packet received and may decide what to do with this packets and the other packets of the object response.

In an embodiment, in case no response forwarding rules exist, the controller generates response forwarding rules for routing back to further response packets of the object response. This enables in a fast and simple way that the further packets of the object response are transmitted directly, i.e. without transmitting via the controller, to the origin of the object request. This reduces the load on the controller and ensures a fast reply to an object response.

In an embodiment, an egress network element delivering the object response to the outside object requestor informs the controller that the object response was completely delivered and the controller upon receiving this information removes the corresponding forwarding rules and/or response forwarding rules from the forwarding elements. This saves storing capacity in the forwarding elements and prevents storing of outdated forwarding rules.

In an embodiment, for routing object requests and/or object responses between non-information centric networks parts and information centric network parts within the software defined network, source and/or destination information of the object, preferably IP-address and port numbers are adapted on the border between the parts. This enables for example when information centric network nodes are deployed in non-software defined control islands, a communication within the whole information centric network enhancing the flexibility for using information centric networks.

In an embodiment, if the object of the object request cannot be provided by the object source, a corresponding non-availability message is generated and provided to the controller and/or the object source forwards the request to the controller, wherein the controller then performs a lookup for an alternative object source and forwarding rules in the forwarding elements are updated according to the alternative object source. This provides a flexible way to deal with failed requests, if for example the cache does not have the name data object. This may be for example the case, when the controller does not have complete information or because the object source/cache evicted the content to cache other objects. When for example the controller performs the lookup for the alternative object source it is ensured that a high user experience of the requestor is provided, since the probability of receiving the object of the object request is increased without further user interaction.

In an embodiment, when a further object request for the same object is received by the information centric network before a response has been generated by the object source, the further object request is answered by copying the response of the object request, preferably wherein the controller instructs the last forwarding element on a shared response path to duplicate the response to both object request origins. This enables information centric network request aggregation and thus, for example avoiding to send two requests for the same named data object through the whole information centric network. If some part of the path towards the source is shared, the request and the named data object is transmitted only once over the shared path. When a second request for the same named data objects arrives before the response of the first one was initiated, for example the response path for the named data object may be set up to include copying the response to both ingress network elements. For the ingress element of the second request a re-write rule may be use the origin, for example IP-address and corresponding port of the second requestor. The controller may use the knowledge about a request popularity for example by analyzing certain object requests and ingress nodes to redirect responses for example through caches closer to the ingress network elements.

In an embodiment, the controller installs dropping rules on the forwarding elements to drop all requests and responses once one of the object sources has provided an object response. This enables a very fast object response without increasing the traffic in the information centric network.

In an embodiment, for transmitting object packets within the information centric network a TCP based connection is initiated by transmitting a SYN packet and at the same time a UDP packet including an object name and message ID.

When using TCP connections for information centric networks the SYN packet does not include object name or message ID which is however required by the controller. This means that the object source cannot be determined before a TCP connection is established. Therefore when initiating the TCP connection by sending a SYN packet and at the same time issuing a UDP packet with the information centric network object request including object name and message ID and with a UDP packet including the TCP's client port number, the controller may use the UDP packet to determine the information centric network node/cache/object source to contact. The UDP packet is then dropped and the TCP connection can be established and transmit the request by repeating the request from the UDP packet to the object source, which can then respond through the same TCP connection.

In an embodiment, one or more proxy nodes within the information centric network are provided and for transmitting object packets within the information centric network TCP-based connections are redirected to the one or more proxy nodes, wherein the one or more proxy nodes set up a TCP connection to the object source. This has the advantage that in case of a cache not being able to respond to a request and the TCP connection being already set up, a new connection to a correct information centric network node/object source is required, which can be established by the proxies: The proxies can set up dedicated TCP connections to the appropriate object sources and proxy the request and response. Another advantage is that redirecting/copying responses through/to multiple targets is provided by the proxies enabling to fill object sources or caches "closer" in a network topological sense to the requestor. If the cache is not being able to respond to a request another option is without using the proxies to dedicate the information centric network node that misses the named data object as proxy. Instead of sending the object response directly back to the requestor the information centric network node in the middle relays it and may cache it.

In an embodiment, the forwarding rules are aggregated according to destination, preferably by object source. This reduces the state in the software defined network elements, i.e. the forwarding elements. Rules may be installed per message ID. For request redirection a default IP route aggregation may be used. For the response direction the internal routing information embedded in one of the port numbers may be used.

In an embodiment, all packets are sent via the controller. Therefore forwarding rules do not need to be installed, thus reducing the state in the software defined network elements even further.

In an embodiment, when an object request is processed by the controller a response path for the object request is determined and installed, preferably on the forwarding elements. This further reduces the state in the controller.

In an embodiment, a pre-given inactivity time period for a forwarding rule is defined, wherein the forwarding rule is removed when during the inactivity time period no object packets are processed according to the forwarding rule. This also reduces the state in the controller and reduces the traffic for deinstalling the forwarding rules, since the forwarding rules may be removed automatically when the inactivity time period is over and no object packets are processed.

FIG. 1 shows a part of a method and a system according to a first embodiment of the present invention.

In FIG. 1 an overall operation of the information centric network is shown. The network comprises an information centric network requestor R outside the physical network PN of the information centric network, forwarding network elements S1, S2 and S3 within the physical network PN and one or more object caches or object sources N1, holding copies of named data objects NDO. The physical network PN is controlled by at least one software defined network controller C. The network elements S1 and S2 may be software defined network switches whereas network element S3 may be a legacy switch.

When the requestor R sends an information centric network request for a named data object NDO to the information centric network ICN in an initial step 0, a network element S1 in the physical network PN detects the corresponding ICN request, for example based on an earlier configuration provided by the software defined network controller in a first step 1. The network element S1 sends a request indication comprising the request packet to SDN controller C in a second step 2. The SDN controller C may have information centric network routing information and may identify one or more destinations respectively object sources for the request. The SDN controller C then determines a forwarding or routing decision in a third step 3. The SDN controller C then uses a software defined network control protocol to install corresponding forwarding rules for the request in the information centric network in a fourth step 4. These forwarding rules enable network elements S1, S2 and S3 to forwarding the request for the requestor R to the identified cache in a fifth step 5 and to forward an eventual response message back to the requestor R. Once the request has reached the object cache N1, the object cache N1 generates a response message with the requested object.

In a sixth step 6 this response message is forwarded according to the previously installed forwarding rules back to the network element S1. The network element S1 then indicates in a seventh step 7 the response message reception to the controller C which can then remove any state about the installed forwarding rules and the request in an eighth step 8 on the forwarding elements S1, S2. In a ninth step 9 the response message is delivered to the outside requestor R.

For operation of the information centric network, the information centric network protocol enables access to named data objects NDO provided by the information centric network. Such an ICN protocol provides different message types such as a GET request, i.e. ICN request mentioned above, and a corresponding response message. Parameters of such a GET request include a name of the requested named data object NDO and further may include a message identifier or message ID to distinguish different messages in the information centric network.

Packets of ICN messages include for example an ICN protocol identifier, enabling that SDN network elements S1 and S2 can match on this identifier. A dedicated transport protocol port number may be used as destination or source port depending on the message type, i.e. request or response. Another alternative may be a dedicated transport protocol matching in the respective IP header field of packets of ICN messages. A publicly routable network address per domain is also provided by the information centric network allowing an easy mechanism to determine, for example a target IP address from outside the controlled network domain. Such a network address can be used to identify packets that have not been changed for forwarding according to forwarding rules of the software defined network. Preferably a specific IP prefix, for example a /32 for IPv4 or /128 for IPv6 may be selected from network main IP address pool for entering the ICN controlled network ICN. This may be announced on every software defined network enabled network element S1, S2, S3 and made public for example via domain name service. An object name used to determine the path of the packets, i.e. the routing, is also provided. Even further, a message ID will be used for a forwarding decision in the network elements S1, S2, S3 on the determined network path. The message IDs may replace destination IP addresses in requests and source IP addresses in responses. The SDN controller C has knowledge about the location of the named data objects NDO inside the corresponding network domain and the controller C is operable to set up forwarding rules on all software defined network elements S1, S2, S3 in the corresponding network domain. Further the software defined network elements S1, S2, S3 may support network address translation in an analog way, preferably IP address rewriting and the port rewriting.

Figure 2:
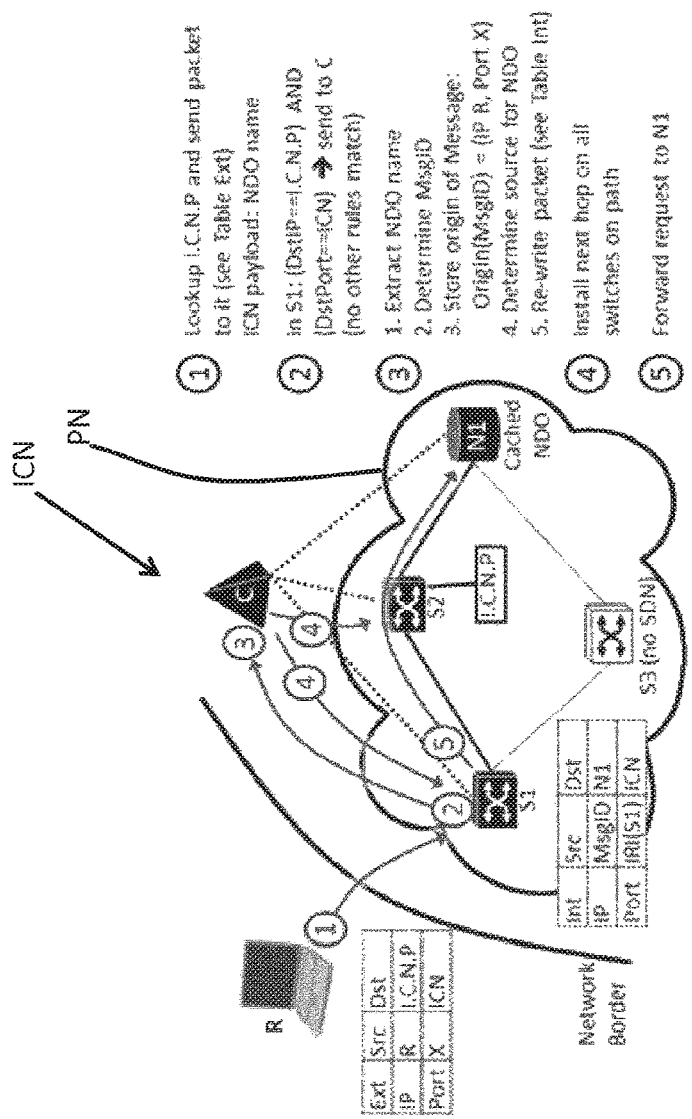
FIG. 2 shows a part of a method and a system according to a second embodiment of the present invention.

FIG. 2 shows a part of a method and a system according to a second embodiment of the present invention.

In FIG. 2 processing of information centric network requests of the requestor R is shown along with IP-address and port number rewriting.

When a requestor R wants to query an object from an information centric network service the requestor R first performs a lookup for the publicly routable network address as specifying the information centric network prefix ICNP of the respective domain. This lookup may be done by using domain name services and asking for the IP address of a world-wide unique name prefix plus the domain name of the network operator, for example "icn-prefix.operatordomain-.topleveldomain" in a first step 1.

Once the ICN prefix ICNP has been determined in the first step 1 an IP packet is sent with destination IP address of the information centric network prefix ICNP. The destination port number may be set to the ICN protocol identifier. The source IP address and port number may be determined by the requestors IP stack. The requestor R is represented here by the requestor's IP address R and X to represent the local port number at the requestor R shown in table Ext in FIG. 2. As an application payload the requestor R may follow the specification of the ICN protocol including at least the name of the requested named data object NDO. The ICN prefix ICNP must only be announced by software defined network enabled network elements S1, S2. This ensures that IP routing sooner or later delivers the packets of the object request to an ingress software defined network element S1. The ingress network element S1 tries to match in a second step 2 the packet to its rules and may find that only the "default ICN" forwarding rule matches. This forwarding rule matches for the combination of destination IP address and destination port and sends packets to the controller C, if they are information centric network prefix ICNP and information centric network with port set to "ICN". For example when using the open flow protocol as ICN protocol only the first n bytes of a packet may be sent to the controller C and the whole packet is temporarily stored in a buffer in the ingress network element S1. In this case a configuration of the forwarding rule of the forwarding network element S1 needs to make sure that enough payload is transferred to the controller C such that the complete requested object name is included to be analyzed by the controller C.

Upon reception of the packet by the controller C in a third step 3 the controller C will pass the ICN protocol payload and extract the requested object name of the request of the named data object NDO. If the ICN protocol does not use 32 bit message IDs a new random and currently not used message ID is generated. The origin of the request, here IP address of the requestor R and port number X, are stored in the controller C. A location of the named data object, here the address of a cache serving the requested object NDO is determined by the controller C. Then comparable to network address translation NAT the IP addresses and port numbers of the packets are rewritten, for example according to table Int in FIG. 2: The new destination IP address is the IP address of the cache N1 from which the object should be served. The new source IP address is the message ID MsgID. The destination port number is kept to identify the packets as an ICN packet. In addition the source port number is changed in order to identify the "ingress" forwarding network element S1. This internal routing information IRI can be used to aggregate forwarding rules, i.e. read forwarding routes for response packets.

In a fourth step 4 the controller C installs forwarding rules for read rules on all the software defined network elements S1, S2 on the path to the object source/cache N1 and sends the rewritten packet back to the ingress network element S1. These rules include a check if the port number matches "ICN". The rules can either use the message ID MsgID as match criteria or can be aggregated using the destination IP addresses. Eventually in a fifth step 5 the packet is forwarded to the object source N1, the cache serving the object. When using the IP address of the object source N1 as destination IP address, non-software defined network paths, for example via network elements S1, S2 to the object source N1 may be used.

Figure 3:
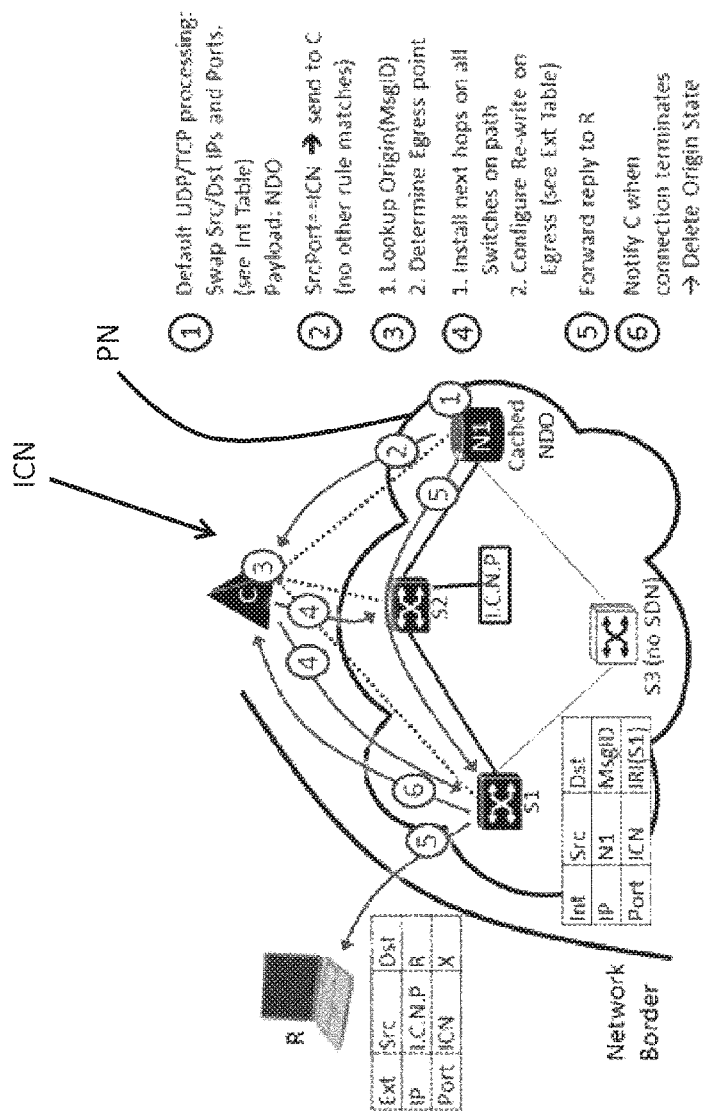
FIG. 3 shows a part of a method and a system according to a third embodiment of the present invention.

FIG. 3 shows a part of a method and a system according to a third embodiment of the present invention.

In FIG. 3 processing of information centric network responses is shown.

The object source N1 does not need a special network stack. The object source respectively the ICN node N1 may simply listen to the ICN port. When requests arrive at the object source N1 on port "ICN" the request will be processed and a corresponding response message either positive or negative will be generated.

In a first step 1 usual UDP and TCP processing of the response packets is performed and the IP addresses and port numbers are swapped according to table Int in FIG. 3. In a second step 2 the first software defined network element, here the object source N1, will forward the first response packet to the controller C, respectively if the object source N1 has a built-in software defined network stack or the object source N1 is configured to send all ICN related traffic out on a port connected to a software defined network controlled network element.

To forward the first response packet to the controller C matching for "ICN" in the source port is performed. The controller C might already have installed a specific, for example based on the message ID MsgID or aggregated, for example based on the internal routing information IRI, rule to forward object responses. In that case the response packets are not sent to the controller C. When the controller C receives a response packet in a third step 3 the controller C will look up the origin of the message ID MsgID of that packet and determine a forwarding path back to the requestor R. This path and the reversal of the IP address and port rewriting rules will be installed in a fourth step 4. The forwarding rules are installed on all switches on the path between the object source N1 and the requestor R. Then in a fifth step 5 the network elements S1, S2 forward the packets to the origin performing the IP address and port rewriting on the "egress" SDN node S1. When the object response has been completely delivered to the requestor R, the ingress SDN network element S1 notifies the controller C that all states for the message ID MsgID can be removed in a sixth step 6. Request forwarding is also possible over non-software defined network control network elements.

However, the response forwarding does not work accordingly as it is using the message ID MsgID as destination IP addresses.

Figure 4:
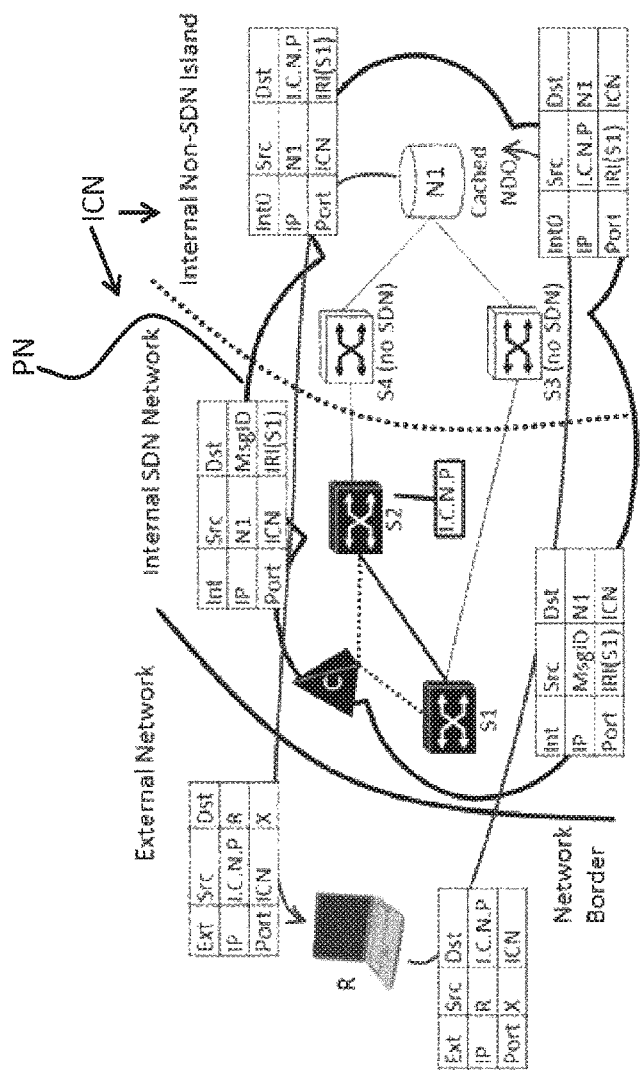
FIG. 4 shows a part of a method and a system according to a fourth embodiment of the present invention.

FIG. 4 shows a part of a method and a system according to a fourth embodiment of the present invention.

In FIG. 4 processing with non-software defined network islands is shown. When ICN network elements S3, S4, N1 are deployed in non-software defined network controlled "islands" a communication is still possible. Instead of using message IDs as destination IP addresses for the response packets addresses from the already deployed ICN prefix ICNP are used as addresses. To support existing network stacks swapping only IP addresses and port numbers a second rewrite operation before forwarding the object request to the non-software defined network control parts of the network is performed.

In FIG. 4 the changes of IP addresses and port numbers along the path of the request, presented by tables Ext, Int and Int0 in the bottom of FIG. 2 from left to right is shown and a corresponding response with tables Int0, Int and Ext in the upper half of FIG. 4 from right to left is shown. By using the ICN prefix ICNP it is ensured that the object responses reenter the software defined network control parts of the overall information centric network.

Figure 5:
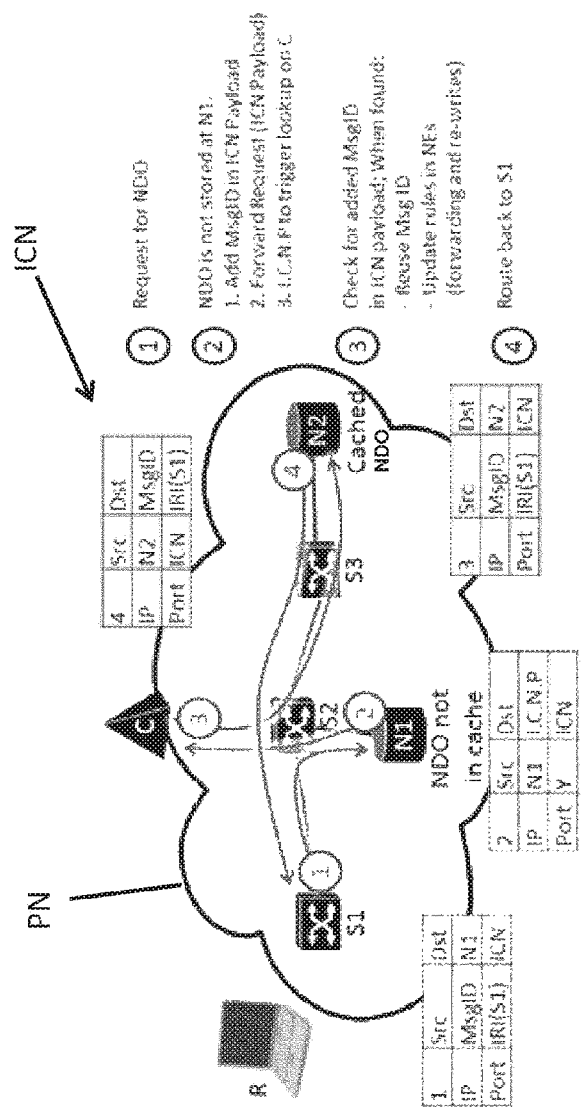
FIG. 5 shows a part of a method and a system according to a fifth embodiment of the present invention.

FIG. 5 shows a part of a method and a system according to a fifth embodiment of the present invention.

In FIG. 5 processing is shown when an object source/cache cannot serve the named data object.

If the object source N1 supposed to deliver the named data object NDO does not have the named data object NDO it cannot fulfill the request. This may for example happen, when the controller C did not have complete or sufficient information. Another possibility is that the cache/object source N1 evicted the content to cache other named data objects NDOs.

As a first option the object source respectively cache N1 can reply with a ICN message indicated to the controller and/or to the requestor R that the content is not available (anymore). Another option is that the cache respectively the object source N1 can forward the request. Such a forwarding of the request is shown in FIG. 5.

The request for the named data object reaches in a first step 1 the object source N1. When the object source N1 cannot serve the request in a second step 2 the corresponding message ID MsgID and the ICN message payload is added. This can be performed directly if the ICN protocol supports this operation or similar to VLAN or MPLS by using tags which are inserted before the ICN message payload.

Then the object request will be reissued using the information of the object source N1 as source IP address and source port and the ICN prefix ICNP as destination IP address. The object source N1 does not need to be aware of the Controller C and can address the new request to ICN prefix ICNP. When the request is resent in a third step 3 and the controller C checks for the added message ID MsgID and if found, this message ID MsgID and the associated internal routing information is reused. Further the controller C is triggered to find a new ICN network element N2 being able to serve the request instead of the previous object source N1. If found then a path will be set up towards the alternative object source N2 which might require to update the rules in the forwarding elements S1, S2 and S3. The outgoing address rewrite rules on the ingress network element S1 also have to be updated to match the new object source N2. In the end in a fourth step 4 the object request will be routed back directly to the requestor R via the ingress network element S1.

Further request aggregation and request forking may be performed by a further embodiment according to the present invention. Request aggregation in information centric networks avoids sending two requests for the same named data object NDO through the whole information centric network. If some part of the path towards the object source/cache N1, N2 is shared then request aggregation is used so that the object request and the corresponding named data object NDO in a response is transmitted only once over the shared path: When a second request for the same named data object NDO arrives before the response of the first one was initiated, the response path for the named data object NDO may be set up to include copying the response to both ingress network elements of the two requests. For the ingress element of the second object request the rewrite rule has to use the origin, i.e. the IP address and port number of the second requestor. The controller may use knowledge about request popularity and ingress network elements to redirect response through caches which are in a network sense "closer" to the ingress network elements, thus, providing a faster and more reliable object response.

Request forking is the opposite of request aggregation. The ingress network element will duplicate the object request and send it out to multiple object sources suitable for providing the named data object NDO. Once the first request generates an object response, the other requests can be ignored. In such a case the SDN controller C generates multiple copies of the object request and targets them to different object sources N1, N2. Once the first cache/object source responds positively the SDN controller C may install message ID specific rules to drop the other requests and their corresponding responses.

Even further according to a further preferred embodiment of the present invention for transferring bigger objects, TCP is used, for example, when the named data objects NDO are bigger than a predetermined maximum transfer unit MTU, e.g. in Ethernet and most networks in the Internet this is around 1500 byte, or >64 kB when using IP fragmentation. By initiating a TCP connection by sending a SYN message and at the same time issuing a UDP packet with an information centric network request including the object name the target ICN network element/object source may be determined and the TCP connection is established.

If the object source is not being able to respond to the request, the TCP connection is already set up and thus a new connection to the correct new object source N2 is required. The new connection may not be necessary when instead of sending the response directly back to the requestor R, an ICN network element in the middle between the object source N2 and the requestor R, relays it and caches it. Since TCP does not support redirecting/copying object responses through or to multiple targets TCP proxying may be used: ICN TCP connections are redirected to dedicated ICN proxy network elements. These proxy elements may then set up dedicated TCP connections to the appropriate object sources/caches and proxy the request and the response.

Further the (internal) state in software defined network elements may be reduced by aggregation of software defined network forwarding rules, for example aggregated by destination. Therefore it is not necessary to install rules per messageID. For an object request direction, default IP route aggregation is possible because the destination IP address can be a routable IP address. For the response direction the internal routing information IRI embedded in one of the port numbers may also be used. Alternatively all object request and object response packets are sent via the controller C and the controller C further decides about the routing. Forwarding rules do not need to be installed in the forwarding network elements.

To further reduce the state in the controller C, the response path for an object response can already be configured when the object request is processed and/or is rewriting at the ingress network element may be pre-configured, so no request origin information has to be stored or processed. If the software defined network forwarding rules are provided with inactivity timers the whole processing of requests and responses may be performed in a "fire-and-forget" manner, i.e. the controller C may set the corresponding rules once and does not have to check whether the rules are outdated or the like.

In summary, an embodiment of the present invention provides a mechanism to enable transferring ICN requests for named data objects and the corresponding responses over an IP network. The present invention, according to an embodiment, further uses the dedicated IP prefix per administrative domain to traverse non-software defined network control parts of the network with the publicly routable network address. The invention, according to an embodiment, further enables a mapping of ICN message identifiers to IP addresses and uses smart IP and port rewriting similar to network address translation inside the software defined network control path of the information centric network to enable almost "native" information centric network operations. The term "native" means here that all network elements are aware of an ICN protocol and participate in the ICN network, i.e. each network element knows how to process an ICN request and an ICN response. The present invention further enables software defined network forwarding rule/ICN route aggregation based on ICN object source IP addresses for requests and internal routing information for responses.

The present invention provides a number of advantages according to various embodiments. The present invention enables ICN communication over an existing network, enables separation of routing and forwarding through a software defined network approach so that state maintenance and complexity requirements on network elements are kept low respectively are reduced. A further advantage of the present invention is that no changes on hosts, i.e. ICN requestor and origin server/cache/object source are required, i.e. the invention may be easily and flexible be implemented on standard network stacks. Further the present invention enables information centric network hosts or network elements to send requests to an information centric network without any knowledge about cache/object source locations and the corresponding addresses.

Even further the present invention provides tunable state management, so complexity can be inside the software defined network elements or inside the corresponding controller.

The present invention enables a requestor to send an ICN request to the ICN network using a pre-configured e.g. or in a name lookup service such as DNS available IP destination address and then the ICN network respectively the network elements controlled by the SDN controller taking care of forwarding the request to an appropriate destination serving the request.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for providing an information centric network with a software defined network based on an information centric networking protocol on top of a physical network based on an internet protocol, the method comprising:
receiving, by a controller in the software defined network, a first packet of an object request in the information centric network which was identified by an ingress element of the information centric network using an information centric network prefix announced by the software defined network;
encoding, by the controller, a message ID indicating an object source of the object request into a header of the first packet by ip-address- and port-rewriting; and
installing, by the controller, forwarding rules using the message ID as a match criterion on forwarding elements in the physical network on a forwarding path to the object source.

2. The method according to claim 1, further comprising removing, by the controller, states for the message ID and removing the forwarding rules that are associated to the message ID based on the controller receiving an indication that the object request has been delivered.

3. The method according to claim 1, further comprising storing origin information of the object request before encoding the message ID.

4. The method according to claim 1, further comprising generating internal routing information of the information centric network based on source information and origin information of the object request, and generating and installing response forwarding rules on the forwarding elements using the internal routing information.

5. The method according to claim 1, wherein the forwarding rules are installed only on the forwarding elements on a network path from the ingress element to the object source.

6. The method according to claim 1, wherein a first response packet generated by the object source in response to the object request is forwarded to the controller based on there being no response forwarding rules.

7. The method according to claim 6, further comprising generating, by the controller, response forwarding rules for routing back further response packets of the object response based on receiving the first response packet.

8. The method according to claim 7, wherein the controller, based on being informed that an egress network element has completely delivered an object response to an outside object requester of the object request, removes the forwarding rules and the response forwarding rules from the forwarding elements.

9. The method according to claim 1, further comprising adapting at least one of source information or destination information of the object request on a border between a non-information centric network part and an information centric network part within the software-defined network so as to enable routing of at least one of the object request or an object response between the non-information centric network part and the information centric network part.

10. The method according to claim 1, wherein a corresponding non-availability message is generated and provided to the controller and/or the object source forwards the object request to the controller based on an object of the object request not being able to be provided by the object source, and wherein the controller then performs a lookup for an alternative object source and the forwarding rules in the forwarding elements are updated according to the alternative object source.

11. The method according to claim 1, wherein, based on a further object request for a same object being received by the information centric network before a response has been generated by the object source, the further object request is answered by copying the response of the object request.

12. The method according to claim 1, wherein the controller duplicates the object request, determines multiple object sources and then installs the forwarding rules on the forwarding elements according to the determined object sources.

13. The method according to claim 12, wherein the controller installs dropping rules on the forwarding elements to drop all requests and responses once one of the object sources has provided an object response.

14. The method according to claim 1, wherein, for transmitting the packets within the information centric network, a TCP based connection is initiated by transmitting a SYN packet and at the same time a UDP packet including an object name.

15. The method according to claim 1, wherein one or more proxy nodes within the information centric network are provided and, for transmitting the packets within the information centric network, TCP based connections are redirected to the one or more proxy nodes, and wherein the one or more proxy nodes setup a TCP connection to the object source.

16. The method according to claim 1, wherein the forwarding rules are aggregated according to destination.

17. A controller of a software defined network for providing an information centric network with the software defined network based on an information centric networking protocol on top of a physical network based on an internet protocol, the controller including one or more computational processors which, alone or in combination, are configured to provide for execution of the following steps:
  receiving a first packet of an object request in the information centric network which was identified by an ingress element of the information centric network using an information centric network prefix announced by the software defined network;
  encoding a message ID indicating an object source of the object request into a header of the first packet by ip-address- and port-rewriting; and
  installing forwarding rules using the message ID as a match criterion on forwarding elements in the physical network on a forwarding path to the object source.

* * * * *